Aug. 21, 1962  H. E. JACKSON  3,049,762
REINFORCED FLEXIBLE TUBING
Filed April 23, 1959
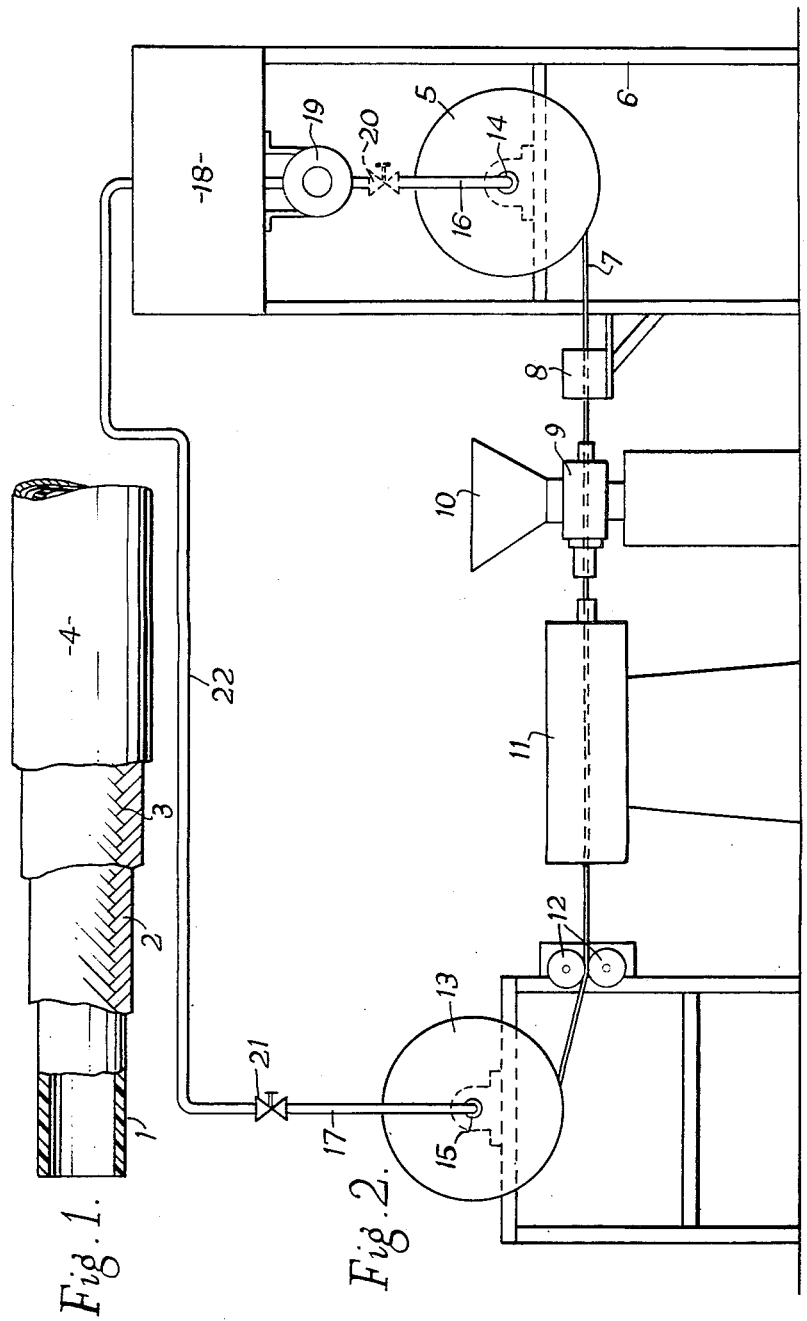
INVENTOR
Harold Ernest Jackson
BY
his ATTORNEY

3,049,762
REINFORCED FLEXIBLE TUBING
Harold Ernest Jackson, Maurice, Devon, England, assignor, by mesne assignments, to Imperial-Eastman Corporation, Chicago, Ill., a corporation of Illinois
Filed Apr. 23, 1959, Ser. No. 809,336
4 Claims. (Cl. 18—59)

This invention relates to flexible tubing and more specifically to methods of manufacturing such tubing.

It is one of the objects of the invention to provide a method of forming flexible tubing which is suitable for the conveyance, if necessary under high pressure, of fluids, including particularly liquids. These include, for example, hydrocarbon fuels and the fluids which are used in hydraulically-operated control systems, such as braking systems for vehicles and other forms of controls which are used in aircraft. The invention is also applicable to forming tubing which is suitable for other purposes, such as to provide the outer sheath of flexible control cable of the Bowden wire type.

The flexible tubing formed in accordance with the invention may comprise an inner hollow core which is formed, preferably by extrusion, of a synthetic plastic material, a sheath formed of a composition of natural or synthetic rubber which surrounds the core and at least one intermediate layer between the core and the sheath.

In the past flexible tubing which is intended for purposes similar to those referred to above and which consists of two or more layers, the inner one of which is made from a synthetic plastic material, has generally been constructed with the aid of a mandrel on which the tubing is formed. In such cases the length of the tubing has been limited by the length of the mandrel. The present invention is concerned with the provision of a method of manufacturing such tubing so that its length is not limited by use of a mandrel.

In the case of tubing, such as that referred to above, which consists of an inner layer and an outer layer or layers, practical difficulties are encountered when the outer layer requires to be heat treated after it has been applied to or formed on the inner layer or layers and when the inner layer is formed of a thermoplastic or other material which will not withstand the temperature necessary for such heat treatment without being softened or otherwise affected by it in an undesirable manner.

It is an important feature of the present invention to provide an improved method of and apparatus for forming such tubing which will enable the outer layer to be treated at a raised temperature in such a way that the effect of the heat on the material of the inner layer is reduced to such an extent that no serious ill effects are produced in the finished tubing.

Therefore, according to a further important feature of this invention, we provide a method of manufacturing flexible tubing having an inner hollow core made of a synthetic plastic material and an outer sheath made of a composition of natural or synthetic rubber or of another material requiring heat treatment at a temperature which is liable to produce softening of or other undesired effects on the material of the inner core, which method comprises extruding the material to form the sheath on to the previously formed core and then passing the tubing through a heating chamber while at the same time keeping the core filled with a cooling liquid.

Alternatively, instead of merely using a cooling liquid, with which the core may be simply filled or which may be caused to flow through the core, while the tubing is passing through the heating chamber, it is possible to keep the core filled under pressure with a fluid, which in this case may be either a gas or a liquid, in order to maintain the shape of the core in spite of any softening of the material forming it.

These two methods may be combined advantageously by using a cooling liquid which is passed through the core of the tubing under a controlled pressure.

The invention may be practiced with apparatus comprising at least one reel on which at least the inner core of the tubing can be wound and which includes a fluid connection to which an end of the core can be connected, means for supplying fluid to the core through the fluid connection while the reel is rotating, an extruder for extruding the material of the sheath so as to form the latter around the core, a heating chamber and means for feeding the tubing with the core filled with the said fluid from the extruder through the heating chamber.

Further features of the invention will become apparent from the following description, taken in conjunction with the accompanying drawing.

In the drawing:

FIG. 1 is a broken-away view, partly in section, showing one form of tubing which may be constructed according to the invention;

FIG. 2 is a general view showing in a schematic manner one form of apparatus which may be used for carrying out the invention.

Referring first to FIG. 1, the tubing T shown comprises an inner core 11 which is made of an extruded thermo-plastic material. Any suitable material may be used, including the polyamide materials known under the name nylon, polyvinyl chloride and polyethylene (or polythene). It is preferred, however, to use the super-polyamide material which is derived from 11-amino undecanoic acid and which is known as "nylon 11."

Surrounding the core 1 are two layers 2 and 3, each of which is formed of braided textile fibres which are preferably in the form of continuous filaments and which may be made of natural or synthetic substances. For these layers it is preferred to use filaments formed of the polyester which is produced by condensing ethylene glycol with terephthalic acid and which is sold under the registered trademark "Terylene," a high tensile type of such filaments being preferred.

The two layers 2 and 3 may be made of the same or different materials, but it is preferred that the filaments of the second or outer layer 3 should be of larger diameter than those of the inner layer 2.

Surrounding the core 1 and the braided layers 2 and 3 is an outer sheath 4, which is made of a natural or synthetic rubber. It is preferred to use a synthetic rubber which is oil resistant, such as that known as neoprene. The outer sheath 4 is preferably bonded to the adjacent intermediate layer 3 by means of an adhesive, for which purpose a self-curing rubber solution may be used.

The number of layers between the core 1 and the sheath 4 may be increased or reduced, if desired. For example there could only be a single braided layer between the core and the sheath.

The construction of the tubing T shown in FIG. 1 will now be described with reference to FIG. 2.

The apparatus shown comprises a supply reel 5 which is rotatably mounted on a stand 6. Wound on the reel 5 is any required length of tubular core $t$ which, in this case, consists of the inner nylon core 1 (FIG. 1) and the two braided intermediate layers 2 and 3 of the partially completed tube T. The purpose of the apparatus is to apply the outer sheath 4 to this tubing core $t$. To do this, the length of tubing $t$ is drawn from the reel 5, which may be provided with a suitable friction brake, through a device 8 for applying the adhesive, which may be done by spraying or by passing the tubing core through a bath of the adhesive. The coated tubing $t$ then passes through the head 9 of an extruder 10 which, using a synthetic rubber composition, forms the outer sheath 4 surrounding the braided layer 3 of the composite tube T.

From the extruder, the composite tubing T passes through a tubular heating chamber 11, in which the temperature, which may be between 100° C. and 200° C., is adjusted to the value necessary to produce vulcanisation of the layer 4 and curing of the adhesive film which secures it to the braided layer 3. This temperature, which may in the present instance be about 135° C. to 140° C., would be liable to affect adversely the inner core 1 by softening it and causing it to become deformed under the pressure of the layers surrounding it. This softening of the inner core is prevented or at least reduced by means which will be described.

The tubing T is drawn from the chamber 11 by means of a pair of grooved rollers 12, from which it is wound on a take-up reel 13, which latter may be frictionally driven by any suitable means.

In order to prevent the softening and possible collapse of the inner core 1, while the tubing is passing through the heating chamber 11, the core is kept filled with a fluid. While it would be possible to use either a cooling liquid, which might be at quite a low pressure, providing that the cooling effect of the liquid is sufficient to prevent softening and collapse of the core 1, or to use a fluid (whether a gas or a liquid) at ordinary temperatures providing that it is under sufficient pressure to prevent collapse of the core 1, even if some softening of the latter should occur, nevertheless, it is preferred to use a cooling liquid which may be cooled below normal room temperature and which is passed through the core 1 of the tubing under a controlled pressure. This may be done in the manner shown generally in FIG. 2.

In this case, the reels 5 and 13 have hollow shafts 14 and 15 which are connected through fluid-tight bearing joints with feed and discharge pipes 16 and 17, respectively.

Each of the shafts 14 and 15 is provided with a nozzle or other device (not shown) to which the ends of the tubings *t* and T are connected respectively.

Cooled water or other liquid coolant is supplied from a refrigerated or cooling tank 18 to the shaft 14 and thus to one end of the tubing *t* by means of a pump 19, the fluid if desired passing through a pressure control valve or like device 20, which may be of an automatic type to maintain the pressure of the fluid supply at a desired value.

The pressure used will depend on the nature and thickness of the layers and on other factors, but it may, for example, be about 900 pounds per square inch.

The temperature at which the coolant is supplied to the tubing *t* may be room temperature or a little below this. In the case of water the temperature may be at any suitable value between freezing point and room temperature, although with other coolants, including brine, temperatures below 0° C. may be used.

The coolant fluid passes through the partially completed tubing *t* and the composite tubing T to the end of the latter which is connected to the shaft 15 of the reel 13, whence it is discharged through a pressure control valve or other suitable device 21, which maintains the coolant under the required pressure within the core of the tubing. The coolant is then returned through a pipe line 22 to the tank 18.

It will thus be seen that, throughout the time that the tubing *t* is passing through the extruder 10 and the heating chamber 11, a continual flow of cooling fluid is being passed through it under a pressure which is controlled by the devices 20 and 21. The cooling action of the fluid, coupled with the heat insulating properties of the braided layers 2 and 3, can be such that, taking into account the temperature of the chamber 11 and the time that the tubing must take to travel through it in order to ensure proper vulcanisation or curing of the outer sheath 4 and the adhesive film, the material of the inner core 1 is maintained at a temperature below its softening temperature, at least in so far as the main thickness of the core is concerned. Any slight softening of the outer region of the core 1 will generally not have any undesirable effect and it may, in fact, provide cohesion with the braided layer 2, and the fluid pressure within the core 1 prevents any possible collapse of the core 1.

It may be noted here that the layers 2 and 3 are made of a material which will withstand temperatures above that which will produce softening of the core 1.

Although it is preferred to use a cooling liquid which is caused to flow through the core of the tubing while the latter is passing through the heating chamber 11, this may not always be necessary. For example, with some forms of tubing *t*, particularly those having cores of large internal diameter, it may suffice to fill the core with a liquid. This may, if desired be kept under pressure, which may be done simply by closing the end of the core remote from the pump 19.

If cooling is not required, the core could simply be supplied, in a similar manner, with air under pressure, the pressure being sufficient to prevent collapse of the core should the material of the latter be softened by the heat.

I claim:

1. The method of manufacturing flexible tubing, comprising the steps of: providing an elongated tubular thermoplastic core having opposite ends; circulating a coolant fluid under a controlled pressure through said core into one end and out from the opposite end thereof; moving the core longitudinally from a supply successively past a sheathing point and a heating point to a take-up while continuing said circulating of the coolant fluid therein; providing a thermosetting sheath on the moving core at said sheathing point; and delivering a preselected quantity of heat energy to the sheath at said heating point to set said sheath, the circulation of the coolant fluid being preselected to maintain substantially all of the core at a temperature below that at which the core material will soften.

2. The method of manufacturing flexible tubing, comprising the steps of: providing an elongated tubular thermoplastic core having opposite ends; circulating a coolant fluid under a controlled pressure through said core into one end and out from the opposite end thereof; moving the core longitudinally from a supply successively past an extruding point and a heating point to a take-up while continuing said circulating of the coolant fluid thereing; extruding a thermosetting sheath onto the moving core at said extruding point; and delivering a preselected quantity of heat energy to the sheath at said heating point to set said sheath, the circulation of the coolant fluid being preselected to maintain substantially all of the core at a temperature below that at which the core material will soften.

3. The method of manufacturing flexible tubing, comprising the steps of: providing an elongated tubular thermoplastic core having opposite ends; circulating a coolant fluid under a controlled pressure through said core into one end and out from the opposite end thereof; moving the core longitudinally from a supply successively past an applying point, an extruding point and a heating point to a take-up while continuing said circulating of the coolant fluid therein; applying a thermosetting adhesive onto the moving core at said applying point; extruding a thermosetting sheath onto the moving adhesive-applied core at said extruding point; and delivering a preselected quantity of heat energy to the sheath at said heating point to set said sheath and adhesive, the circulation of the coolant fluid being preselected to maintain substantially all of the core at a temperature below that at which the core material will soften.

4. The method of manufacturing flexible tubing, comprising the steps of: providing an elongated tubular thermoplastic core having opposite ends; applying a reinforcing braid about the core; circulating a coolant fluid under a controlled pressure through said core into one end and out from the opposite end thereof; moving the braid-covered core longitudinally from a supply successively past an extruding point and a heating point to a take-up while continuing said circulating of the coolant fluid therein; extruding a thermosetting sheath onto the moving core at said extruding point; and delivering a preselected quantity of heat energy to the sheath at said heating point to set said sheath, the circulation of the coolant fluid being preselected to maintain the main thickness of the core at a temperature below that at which the core material will soften while permitting controlled softening of the outermost portion of the core to provide improved cohesion with the reinforcing braid.

References Cited in the file of this patent

UNITED STATES PATENTS

| | | |
|---|---|---|
| 277,019 | Eddy | May 8, 1883 |
| 684,050 | Falconnet et al. | Oct. 8, 1901 |
| 2,286,922 | Muller | June 16, 1942 |
| 2,414,776 | Stephenson et al. | Jan. 21, 1947 |
| 2,491,152 | Beidle | Dec. 13, 1949 |
| 2,556,276 | Henning | June 12, 1951 |
| 2,716,777 | Hagen | Sept. 6, 1955 |
| 2,888,954 | Gates | June 2, 1959 |
| 2,899,982 | Harpfer | Aug. 18, 1959 |
| 2,936,491 | Hamlin | May 17, 1960 |